United States Patent
Oh et al.

(10) Patent No.: US 9,077,584 B2
(45) Date of Patent: Jul. 7, 2015

(54) SYSTEM AND METHOD FOR MANAGING USER PREFERENCE PROFILE

(75) Inventors: Jae-Kwon Oh, Seoul (KR); Pattan Basavaraj Jayawant, Karnataka (IN)

(73) Assignee: Samsung Electronics Co., Ltd (KR)

( * ) Notice: Subject to any disclaimer, the term of this patent is extended or adjusted under 35 U.S.C. 154(b) by 38 days.

(21) Appl. No.: 12/376,079

(22) PCT Filed: Aug. 1, 2007

(86) PCT No.: PCT/KR2007/003711
§ 371 (c)(1),
(2), (4) Date: Feb. 2, 2009

(87) PCT Pub. No.: WO2008/016263
PCT Pub. Date: Feb. 7, 2008

(65) Prior Publication Data
US 2009/0193329 A1    Jul. 30, 2009

(30) Foreign Application Priority Data

Aug. 1, 2006 (IN) .......................... 1364/CHE/2006
Aug. 1, 2007 (KR) ....................... 10-2007-0077317

(51) Int. Cl.
H04L 29/06    (2006.01)
H04L 29/08    (2006.01)
G06F 17/30    (2006.01)

(52) U.S. Cl.
CPC .... H04L 29/06217 (2013.01); H04L 29/08972 (2013.01); H04L 29/06306 (2013.01);
(Continued)

(58) Field of Classification Search
CPC ................... H04L 29/06306; H04L 29/06442; H04L 29/06836; H04L 29/08936; H04L 29/08972; H04L 65/1016
USPC .......................................... 709/203, 206, 230
See application file for complete search history.

(56) References Cited

U.S. PATENT DOCUMENTS 6,490,587 B2    12/2002   Easty et al.
6,757,729 B1 *   6/2004   Devarakonda et al. ....... 709/226
(Continued)

FOREIGN PATENT DOCUMENTS

CN       1552148        12/2004
JP      2003-032721      1/2003
(Continued)

OTHER PUBLICATIONS

XML Document Management Architecture; Candidate Version 1.0—Jun. 28, 2005.*
(Continued)

*Primary Examiner* — Jimmy H Tran
(74) *Attorney, Agent, or Firm* — The Farrell Law Firm, P.C.

(57) ABSTRACT

Disclosed is a system and method for managing a user preference profile, and the system includes a plurality of application clients, a plurality of application servers corresponding to the plurality of application clients, and a shared server for storing and managing user preference profiles for respective applications. The application clients selectively activate the user preference profiles stored in the shared server and provide the selectively activated user preference profiles to the application servers. By storing user preference profiles for respective applications in one location in this way, the user preferences can be efficiently managed.

20 Claims, 11 Drawing Sheets

(52) U.S. Cl.
CPC ....... *H04L29/06836* (2013.01); *H04L 65/1016* (2013.01); *H04L 29/06442* (2013.01); *G06F 17/30699* (2013.01)

(56) References Cited

U.S. PATENT DOCUMENTS

| | | | |
|---|---|---|---|
| 7,010,292 | B2 | 3/2006 | Jerbi et al. |
| 7,068,189 | B2 | 6/2006 | Brescia |
| 7,849,154 | B2 * | 12/2010 | Grecco et al. ............... 709/217 |
| 8,028,077 | B1 * | 9/2011 | Gaya et al. ................. 709/229 |
| 2001/0037407 | A1 * | 11/2001 | Dragulev et al. ........... 709/250 |
| 2001/0047349 | A1 * | 11/2001 | Easty et al. ..................... 707/3 |
| 2002/0049751 | A1 * | 4/2002 | Chen et al. ..................... 707/3 |
| 2003/0182361 | A1 | 9/2003 | Jensen et al. |
| 2004/0122896 | A1 | 6/2004 | Gourraud |
| 2004/0202117 | A1 * | 10/2004 | Wilson et al. ............... 370/310 |
| 2004/0249910 | A1 * | 12/2004 | Jerbi et al. .................. 709/222 |
| 2004/0255031 | A1 * | 12/2004 | Nomura et al. ............. 709/228 |
| 2005/0021784 | A1 * | 1/2005 | Prehofer ...................... 709/229 |
| 2005/0114493 | A1 * | 5/2005 | Mandato et al. ............ 709/223 |
| 2006/0053208 | A1 * | 3/2006 | Laurila et al. .............. 709/206 |
| 2006/0235981 | A1 * | 10/2006 | Westman et al. ........... 709/227 |
| 2007/0073892 | A1 * | 3/2007 | Laurila et al. .............. 709/230 |
| 2007/0088670 | A1 * | 4/2007 | Laurila ............................ 707/1 |
| 2007/0127505 | A1 * | 6/2007 | Laurila et al. .............. 370/400 |
| 2007/0136422 | A1 * | 6/2007 | Ohtani et al. ............... 709/204 |
| 2007/0136475 | A1 * | 6/2007 | Leppisaari et al. ......... 709/227 |
| 2008/0004007 | A1 * | 1/2008 | Kallio ....................... 455/432.2 |

FOREIGN PATENT DOCUMENTS

| | | |
|---|---|---|
| JP | 2005-505195 | 2/2005 |
| JP | 2006-512640 | 4/2006 |
| JP | 2008-512911 | 4/2008 |
| KR | 1020010091276 A | 10/2001 |
| KR | 1020040037192 | 5/2004 |
| KR | 1020040044657 A | 5/2004 |
| WO | WO 03/103271 | 12/2003 |
| WO | WO 2006/051159 | 5/2006 |
| WO | WO 2006/075873 | 7/2006 |

OTHER PUBLICATIONS

Korean Office Action dated Jan. 29, 2015 issued in counterpart application No. 10-2004-0035292.

* cited by examiner

SYSTEM AND METHOD FOR MANAGING USER PREFERENCE PROFILE

PRIORITY

This application claims priority to Indian Patent Application Serial No. 1364/CHE/2006 filed Aug. 1, 2006; to Korean Patent Application Serial No. 10-2007-0077317 filed Aug. 1, 2007; and to International Application PCT/KR2007/003711 filed Aug. 1, 2007; the contents of each of which are incorporated herein by reference.

TECHNICAL FIELD

The present invention relates generally to the field of mobile communication, and more particularly to OMA (Open Mobile Alliance)-developed applications over SIP (Session Initiation Protocol), such as instant messaging (IM), push to talk over cellular (PoC) and any other future applications. In other words, this invention relates to those applications where service settings provided by a user are published to, stored and executed by an application server. More specially, this invention relates to a system and method for managing a user preference profile.

BACKGROUND ART

While providing various services, service providers allow users to choose their preferences to customize the behaviours of applications according to their needs and situations. Currently, the PoC application developed by OMA allows users to configure service settings like Incoming Session Barring, Answer Mode, Incoming Instant Personal Alert Barring, Simultaneous PoC Session Support Settings, etc. Also, the SIMPLE (SIP for Instant Messaging and Presence Leveraging Extensions) IM application developed by OMA defines service settings like Incoming Session Barring, Incoming IM Pager Mode Barring, Delivery of Deferred Messages, etc. New applications under development also have similar service settings. A user makes use of his/her client application to indicate his preferences to respective application servers. Some applications of the prior art are identified as will be described below:

As an example, FIG. 1 illustrates OMA-developed SIMPLE IM and PoC applications. For other applications, there are similar architectures. The interfaces used for publishing service settings in the prior art are designated by dotted lines. It should be noted that each client application publishes service settings onto its own application server and thus multiple service setting may be published.

A flow diagram showing a process of publishing service settings by a user is illustrated in FIG. 2.

SIP PUBLISH is a method used for publishing service settings onto an application server via an SIP interface. Usually, service setting publication occurs after each registration, and also occurs as and when a user wants to update/refresh his service settings (S210). The application server 111, 121 stores such user preferences and executes as and when applicable (S230).

The aforementioned prior art has the following limitations:
I. Increasing number of applications will lead to storage of user preferences in a distributed manner.
II. Increases the number of service setting publications.
III. Complex for a user to manage service settings.
IV. Increases cost.

DISCLOSURE

Technical Problem

The object of the present invention is to provide a system and method for storing and managing various application service settings at a shared location, thereby reducing the complexity of service setting maintenance and the number of service setting publications onto an application server. The present invention also provides an operation in which the application server performs service settings by using existing interfaces when storing the service settings at the shared location. The present invention need not define any new interface to overcome weaknesses identified in the relevant prior art.

Technical Solution

In order to solve the aforementioned technical problem, the present invention provides a system for managing a user preference profile, the system including: a plurality of application clients; a plurality of application servers corresponding to the plurality of application clients; and a shared server for storing and managing user preference profiles for respective applications, wherein the application clients selectively activate the user preference profiles stored in the shared server and provide the selectively activated user preference profiles to the application servers.

Also, the present invention provides a method of managing a user preference profile, the method including the steps of: creating a plurality of user preference profiles, each corresponding to each application, by a plurality of application clients; storing the created user preference profiles in a shared server; selectively activating the stored user preference profiles; and providing the selectively activated user preference profiles to corresponding application servers.

Advantageous Effects

1. By storing (or configuring) a plurality of user preference profiles corresponding to various applications at a common location, which can result in structured and optimized deployment of the user preference profiles.
2. XCAP Operations are used for Profile Manipulations— XCAP operations are less expensive than SIP operations.
3. A user can set a plurality of user preference profiles at once, and need not publish them each time he/she registers.
4. Complexity for a user to manage service settings is reduced.
5. Resources usage from limited resources available on a client is reduced.
6. It is possible to modify service settings of multiple services with just one XCAP operation.
7. Pre-configured multiple preferences profiles can be stored, which enables easy switchover between different profiles.
8. User preference profiles are easily extensible.
9. User preference profiles for various applications can be selectively activated.
10. When user preference profiles are selectively activated, automated setting can be easily implemented by a scheduling function, etc.

BEST MODE

[Mode for Invention]

With an increase in the number of services using various applications, each of which requires some service settings to be indicated by user preferences, the service settings are stored in application servers in a distributed manner. The invention proposes to aggregate such service settings at a common location like a shared user profile XDMS (XML Document Management Server). Also, when a user enables any one of instances of those pre-configured service settings, all the conforming service settings in the profile instance can be activated at the same time in each corresponding server.

Figure 1:
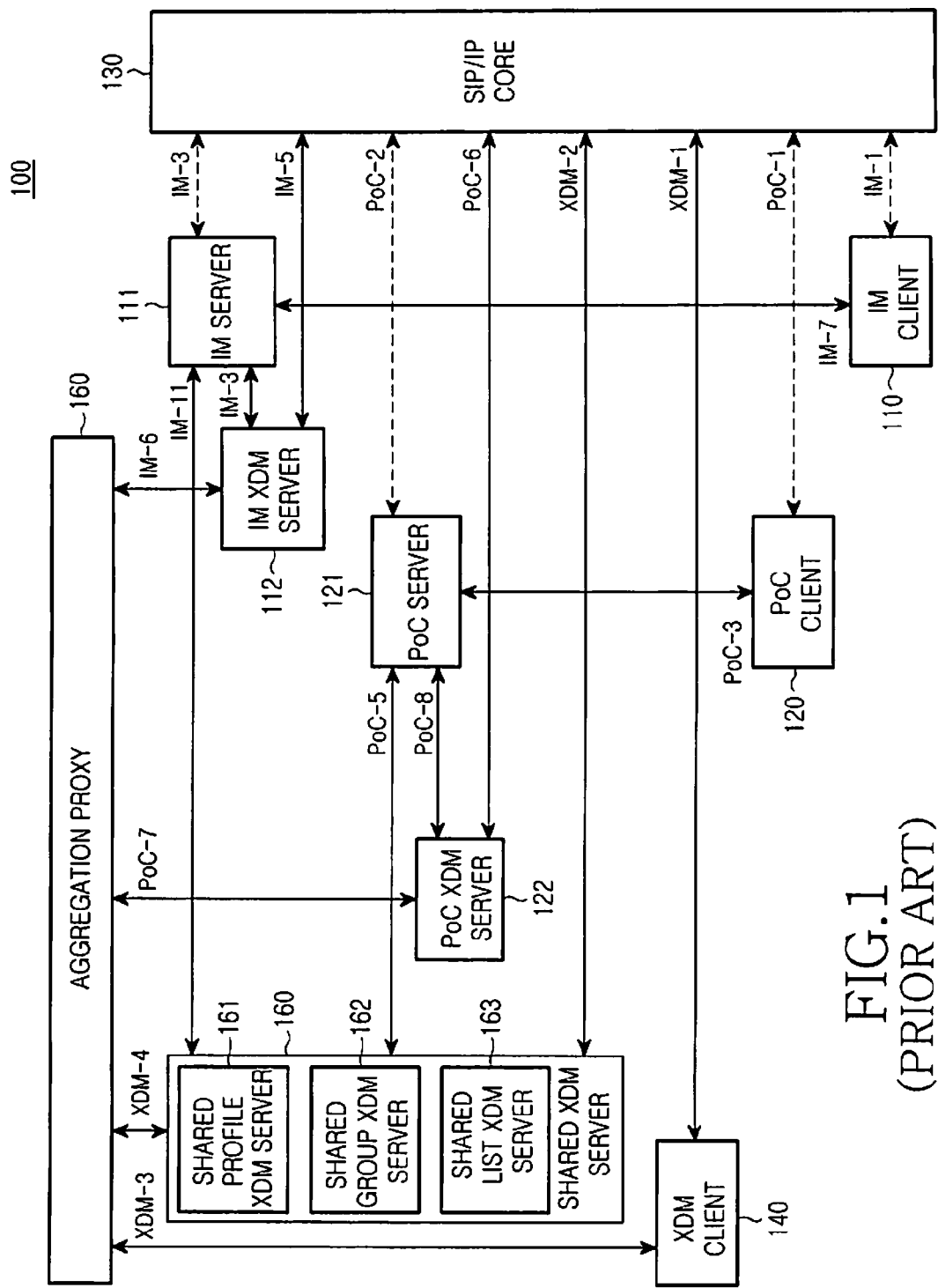
FIG. 1 depicts the OMA-developed SIMPLE architecture used in the prior art with indication of interfaces.
Figure 2:
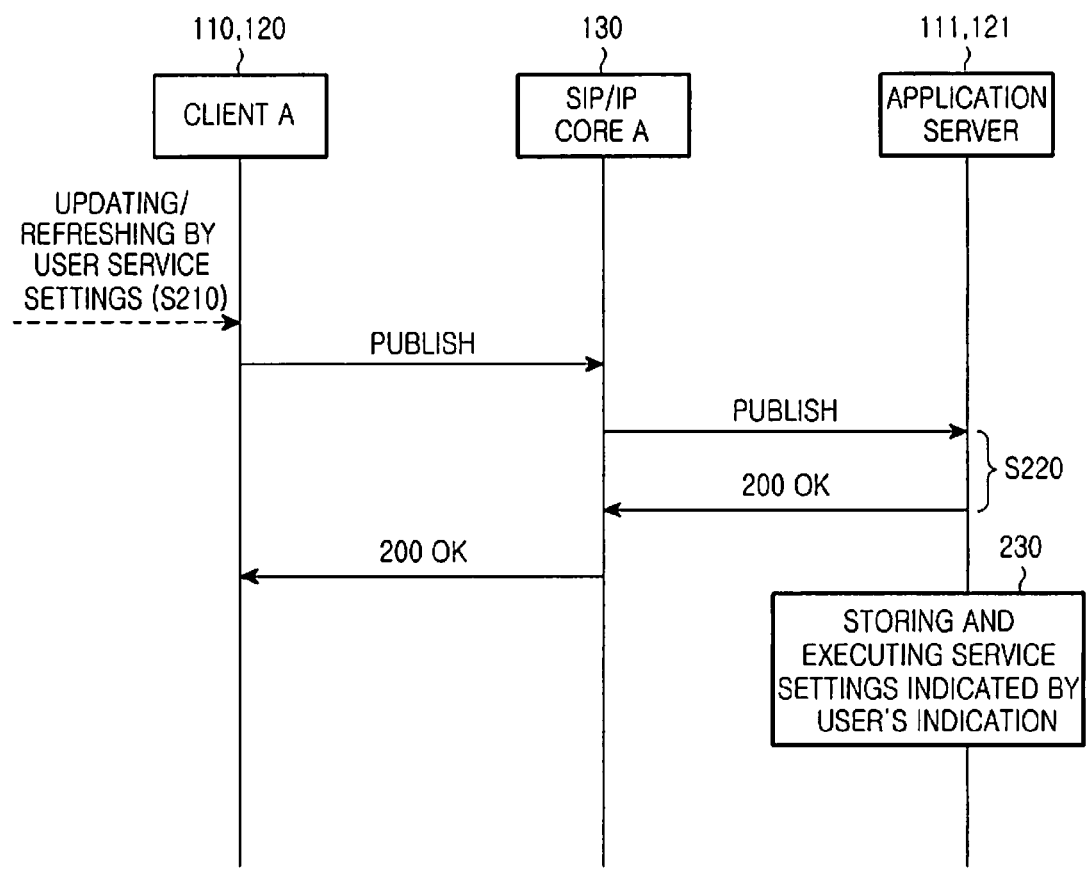
FIG. 2 depicts a user's indicating his/her preferences via SIP PUBLISH as in the prior art.
Figure 3:
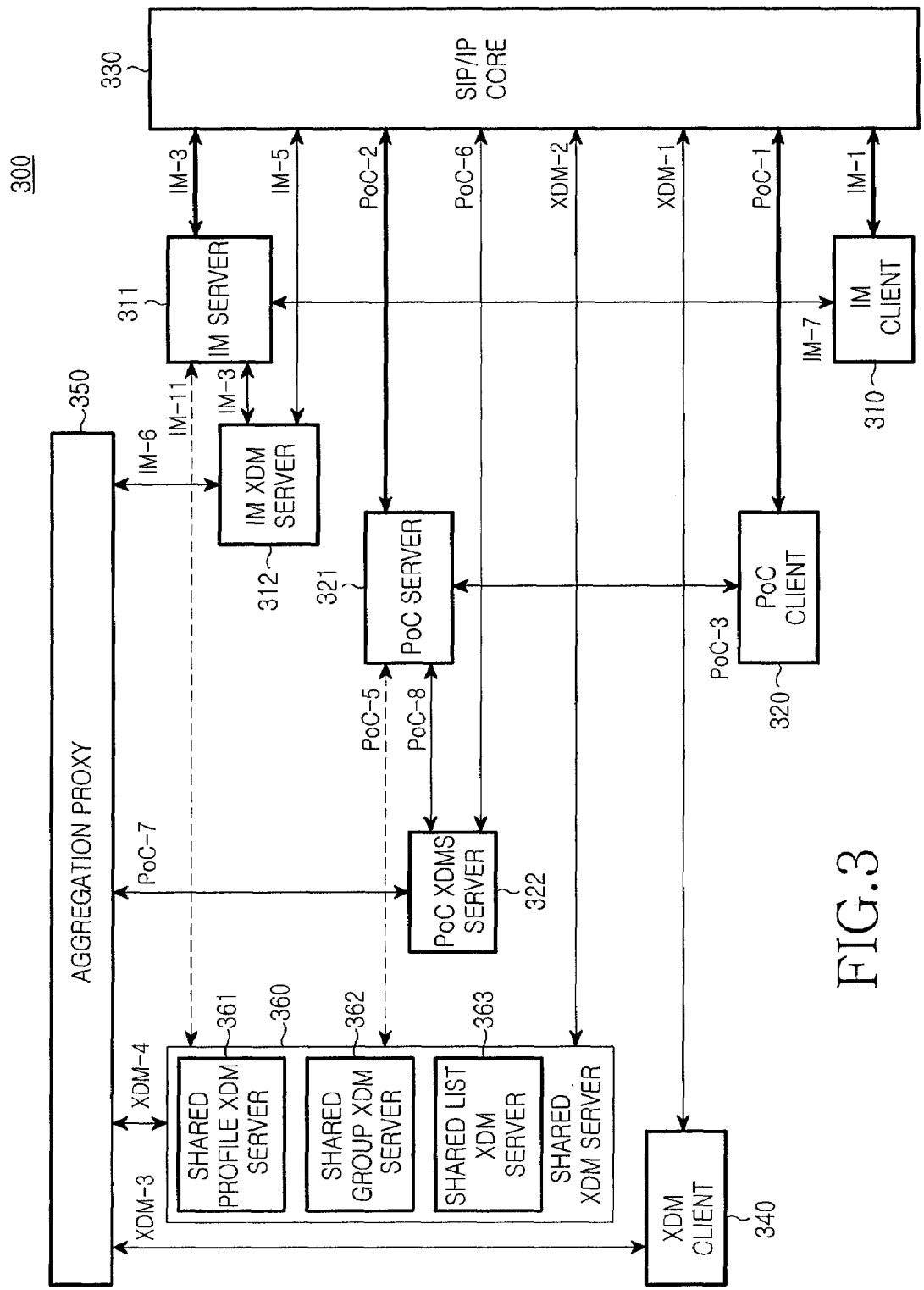
FIG. 3 depicts the OMA-developed SIMPLE architecture used in the invention with indication of interfaces.

As illustrated in FIG. 3, a system includes a shared XDM server 360, an aggregation PROXY 350, a PoC DXMS server 322, a PoC server 321, an IM XDM server 312, an IM server 311, an SIP/IP core 330, an XDM client 340, a PoC client 320, and an IM client 310. The shared XDM server 360 includes a shared profile server 361, a shared group DXM server 362, and a shared list XDM server 363.

As an example, FIG. 3 illustrates OMA-developed SIMPLE IM and PoC applications. Similar architectures may exist for other applications. Interfaces used in the invention are designated by dotted lines. It should be noted that service settings for multiple services can be put on to a shared profile XDM server 361 or any other similar entities 362, 363 with just one XCAP operation.

For logical and simplicity reasons in explaining this invention, the shared profile XDMS is considered a location for storing aggregated service settings, but they may be stored in any such similar entity.

This invention proposes a new schema for multiple profiles and aggregating various service settings. For simplicity, it is assumed that the schema provides details considering the settings possible as identified in the existing art. The schema can be extended to accommodate potential future services and also changes to the service settings of already existing services. The content type may be called as "application/user-preference-profile". There are two possible approaches for active profile indication:

1. Approach where an active profile is indicated by a flag.
2. Approach where an active profile is indicated by an attribute.

A generic user preferences profile format for active profile indication by a flag is presented below in Table 1:

TABLE 1

```
<?xml version="1.0" encoding="UTF-8"?>
<service-profile-set user="USER_SERVICE_URI">
    <!-- Profile1 -->
    <service-profile    id="xxx"    name="PROFILE_1" status="ACTIVE_OR_INACTIVE">
        <!-- Service enabler common settings -->
        <common-service-settings>
            <common-service-setting1>value</common-service-setting1>
            <common-service-setting2>value</common-service-setting2>
            <!-- Other settings could be specified further -->
        </common-service-settings>
        <!-- Service enabler specific settings -->
        <service-settings service-id="SERVICE_NAME_1">
            <service-setting1>value</service-setting1>
            <service-setting2>value</service-setting2>
            <!-- Other settings could be specified further -->
        </service-settings>
        <!-- Service enabler specific settings -->
        <service-settings service-id="SERVICE_NAME_2">
            <service-setting1>value</service-setting1>
            <service-setting2>value</service-setting2>
            <!-- Other settings could be specified further -->
        </service-settings>
        <!-- Other service enabler specific settings could be
        specified further -->
    </service-profile>
    <!-- Profile2 -->
    <service-profile    id="yyy"    name="PROFILE_2" status="ACTIVE_OR_INACTIVE">
        <!-- Service enabler common settings -->
        <common-service-settings>
            <common-service-setting1>value</common-service-setting1>
            <common-service-setting2>value</common-service-setting2>
            <!-- Other settings could be specified further -->
        </common-service-settings>
        <!-- Service enabler specific settings -->
        <service-settings service-id="SERVICE_NAME_1">
            <service-setting1>value</service-setting1>
            <service-setting2>value</service-setting2>
            <!-- Other settings could be specified further -->
        </service-settings>
        <!-- Service enabler specific settings -->
        <service-settings service-id="SERVICE_NAME_2">
            <service-setting1>value</service-setting1>
            <service-setting2>value</service-setting2>
            <!-- Other settings could be specified further -->
        </service-settings>
        <!-- Other service enabler specific settings could be
        specified further -->
    </service-profile>
    <!-- Other profiles could be specified further -->
</service-profile-set>
```

A generic user preferences profile format for active profile indication by an attribute is presented below in Table 2:

TABLE 2

```
<?xml version="1.0" encoding="UTF-8"?>
<service-profile-set    user="USER_SERVICE_URI" active_profile="PROFILE_1 OR PROFILE_2 etc">
    <!-- Profile1 -->
    <service-profile id="xxx" name="PROFILE_1">
        <!-- Service enabler common settings -->
        <common-service-settings>
            <common-service-setting1>value</common-service-setting1>
            <common-service-setting2>value</common-service-setting2>
            <!-- Other settings could be specified further -->
        </common-service-settings>
        <!-- Service enabler specific settings -->
        <service-settings service-id="SERVICE_NAME_1">
            <service-setting1>value</service-setting1>
            <service-setting2>value</service-setting2>
            <!-- Other settings could be specified further -->
```

TABLE 2-continued

```
    </service-settings>
    <!-- Service enabler specific settings -->
    <service-settings service-id="SERVICE_NAME_2">
        <service-setting1>value</service-setting1>
        <service-setting2>value</service-setting2>
        <!-- Other settings could be specified further -->
    </service-settings>
    <!-- Other service enabler specific settings could
    be specified further -->
    </service-profile>
<!-- Profile2 -->
<service-profile id="yyy" name="PROFILE_2">
    <!-- Service enabler common settings -->
    <common-service-settings>
        <common-service-setting1>value</common-service-setting1>
        <common-service-setting2>value</common-service-setting2>
        <!-- Other settings could be specified further -->
    </common-service-settings>
    <!-- Service enabler specific settings -->
    <service-settings service-id="SERVICE_NAME_1">
        <service-setting1>value</service-setting1>
        <service-setting2>value</service-setting2>
        <!-- Other settings could be specified further -->
    </service-settings>
    <!-- Service enabler specific settings -->
    <service-settings service-id="SERVICE_NAME_2">
        <service-setting1>value</service-setting1>
        <service-setting2>value</service-setting2>
        <!-- Other settings could be specified further -->
    </service-settings>
    <!-- Other service enabler specific settings could be
    specified further -->
    </service-profile>
    <!-- Other profiles could be specified further -->
</service-profile-set>
```

A user can create profiles with names like Home Profile, Office Profile, Travel Profile, Sleep Profile, Outdoor Profile, Meeting Profile and the like, each of which contains service settings of various services, such as Incoming Session Barring, Incoming Instant Personal Alert Barring, Incoming IM Pager Mode Barring, etc. and user preference values for the respective settings.

Figure 4:
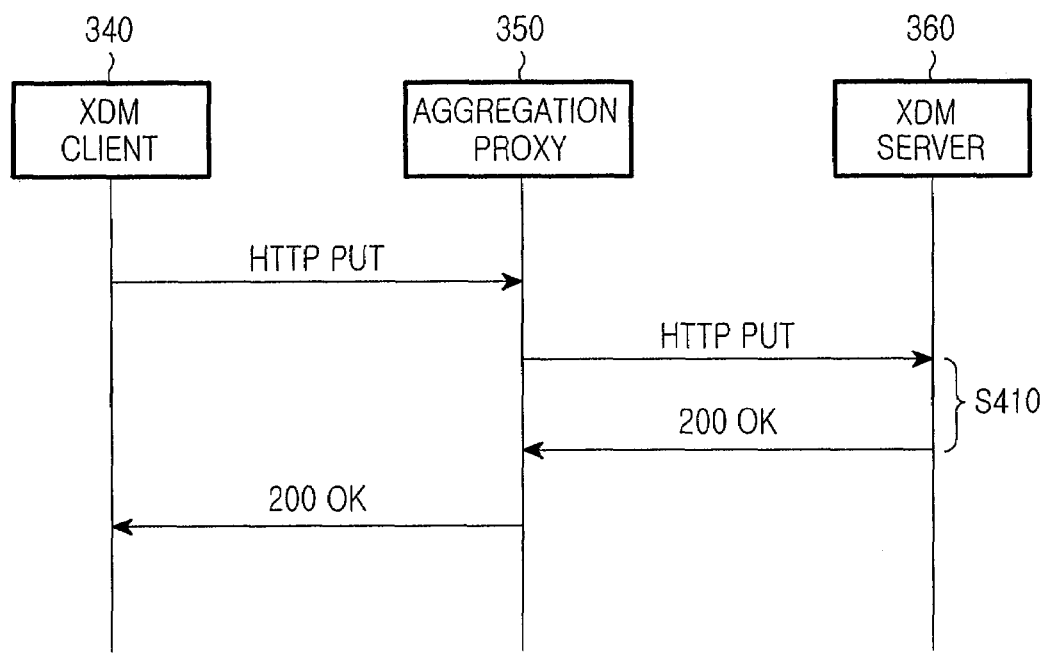
FIG. 4 depicts a user's creating a preferences profile.

The protocol used for creating a user preferences profile onto the XDMS is as illustrated in FIG. 4. The invention proposes to use an XCAP PUT method for creating a user preferences profile. The Client receives 200 OK on successful creation of the profile (S410).

An example of a generic user preferences profile with active profile indication by a flag is presented below in Table 3:

TABLE 3

```
PUT
http://xcap.example.com/user-preference-profile/users/
sip:jay@example.com/index
HTTP/1.1
...
    Content-Type: application/user-preference-profile+xml
    Content-Length: (...)
    <?xml version="1.0" encoding="UTF-8"?>
    <service-profile-set user="jay@example.com">
    <!-- Home Profile -->
    <service-profile id="3i8jx" name="home" status="active">
        <!-- Service enabler common settings -->
        <common-service-settings/>
        <!-- PoC specific service settings -->
        <service-settings service-id="org.openmobilealliance.poc">
            <answer-mode>manual</answer-mode>
<incoming-poc-session-barring>inactive</incoming-poc-session-
barring>
<incoming-instant-personal-alert-barring>inactive</incoming-instant-
personal-alert-barring>
<simultaneous-poc-session-support>inactive</simultaneous-
poc-session-support>
        </service-settings>
        <!-- IM specific service settings -->
        <service-settings service-id="org.openmobilealliance.im">
<incoming-im-session-barring>inactive</incoming-im-session-barring>
<incoming-im-pager-mode-barring>inactive</incoming-im-pager-
mode-barring>
            <deferred-messages-delivery>inactive</deferred-
            messages-delivery>
            <im-visibility>inactive</im-visibility>
            <conversation-history>inactive</conversation-history>
        </service-settings>
    </service-profile>
    <!-- Office Profile -->
    <service-profile id="10101" name="office" status="inactive">
        <!-- Service enabler common settings -->
        <common-service-settings/>
        <!-- PoC specific service settings -->
        <service-settings service-id="org.openmobilealliance.poc">
            <answer-mode>auto</answer-mode>
<incoming-poc-session-barring>active</incoming-poc-session-barring>
<incoming-instant-personal-alert-barring>active</incoming-instant-
personal-alert-barring>
<simultaneous-poc-session-support>active</simultaneous-
poc-session-support>
        </service-settings>
        <!-- IM specific service settings -->
        <service-settings service-id="org.openmobilealliance.im">
            <incoming-im-session-barring>active</
            incoming-im-session-barring>
<incoming-im-pager-mode-barring>active</incoming-im-pager-
mode-barring>
            <deferred-messages-delivery>active</
            deferred-messages-delivery>
            <im-visibility>active</im-visibility>
            <conversation-history>active</conversation-history>
        </service-settings>
    </service-profile>
</service-profile-set>
```

An example of a generic user preferences profile with active profile indication by an attribute is presented below in Table 4:

TABLE 4

```
PUT
http://xcap.example.com/user-preference-profile/users/
sip:jay@example.com/index
HTTP/1.1
...
    Content-Type: application/user-preference-profile+xml
    Content-Length: (...)
    <?xml version="1.0" encoding="UTF-8"?>
    <service-profile-set user="jay@example.com" active_profile="home">
    <!-- Home Profile -->
    <service-profile id="3i8jx" name="home">
        <!-- Service enabler common settings -->
        <common-service-settings/>
        <!-- PoC specific service settings -->
        <service-settings service-id="org.openmobilealliance.poc">
            <answer-mode>manual</answer-mode>
<incoming-poc-session-barring>inactive</incoming-poc-
session-barring>
<incoming-instant-personal-alert-barring>inactive</
incoming-instant-personal-alert-barring>
<simultaneous-poc-session-support>inactive</
simultaneous-poc-session-support
>
        </service-settings>
        <!-- IM specific service settings -->
        <service-settings service-id="org.openmobilealliance.im">
<incoming-im-session-barring>inactive</incoming-im-session-barring>
<incoming-im-pager-mode-barring>inactive</
incoming-im-pager-mode-barring>
            <deferred-messages-delivery>inactive</
            deferred-messages-delivery>
            <im-visibility>inactive</im-visibility>
```

TABLE 4-continued

```
        <conversation-history>inactive</conversation-history>
      </service-settings>
   </service-profile>
   <!-- Office Profile -->
   <service-profile id="10101" name="office">
      <!-- Service enabler common settings -->
      <common-service-settings/>
      <!-- PoC specific service settings -->
      <service-settings service-id="org.openmobilealliance.poc">
         <answer-mode>auto</answer-mode>
<incoming-poc-session-barring>active</incoming-poc-session-barring>
<incoming-instant-personal-alert-barring>active</
incoming-instant-personal-alert-barring>
<simultaneous-poc-session-support>active</
simultaneous-poc-session-support>
      </service-settings>
      <!-- IM specific service settings -->
      <service-settings service-id="org.openmobilealliance.im">
<incoming-im-session-barring>active</incoming-im-session-barring>
<incoming-im-pager-mode-barring>active</incoming-im-pager-
mode-barring>
         <deferred-messages-delivery>active</deferred-
         messages-delivery>
         <im-visibility>active</im-visibility>
         <conversation-history>active</conversation-history>
      </service-settings>
   </service-profile>
</service-profile-set>
```

Figure 5:
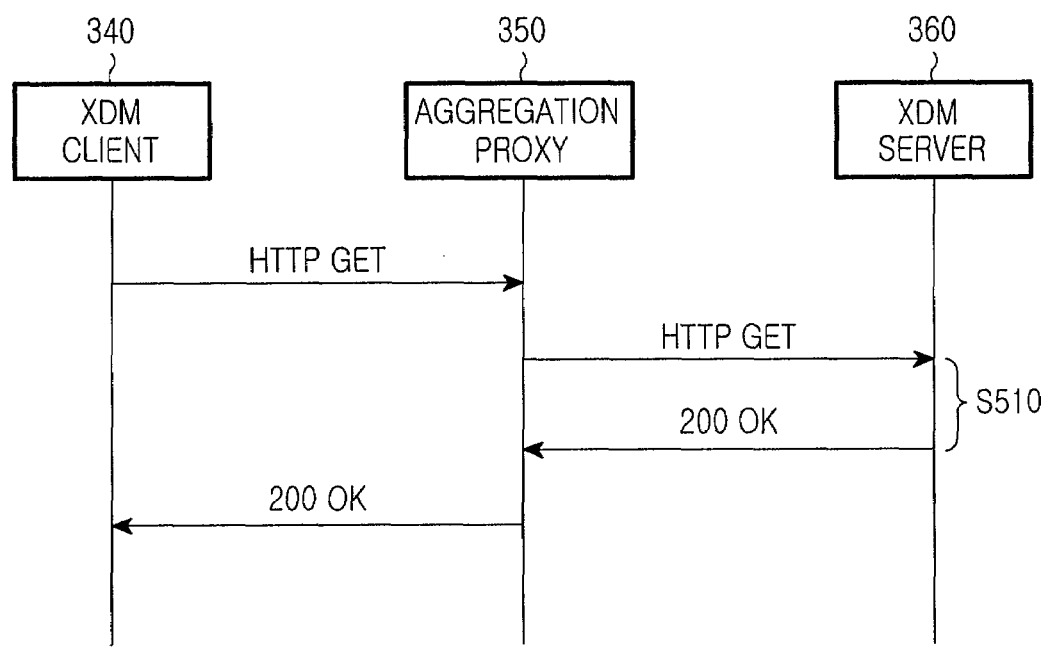
FIG. 5 depicts a user's retrieving a preferences profile.

The user may want to read current preferences indicated by him/her earlier, from various user preference profiles. The invention proposes to use an XCAP GET operation for retrieving the profile as illustrated in FIG. 5. The client receives profile data in the 200 OK response on successful retrieval of the profile (S510).

An example of the user's retrieving a user preferences profile is presented below in Table 5:

TABLE 5

```
GET
   http://xcap.example.com/user-preference-profile/users/
sip:jay@example.com/index
HTTP/1.1
   Host: xcap.example.com
   User-Agent: XDM-client/OMA1.0
   Date: Thu, 08 Jan 2004 10:50:33 GMT
   X-3GPP-Intended-Identity: "sip:jay@example.com"
   Accept-Encoding: gzip
   Content-Length: 0
```

The user may want to change a user preference profile already stored on the XDMS in any one of the following procedures:
1. User may update preference to particular service setting.
2. User may clear preferences to all service settings.
3. User may go back to default preferences.

Figure 6:
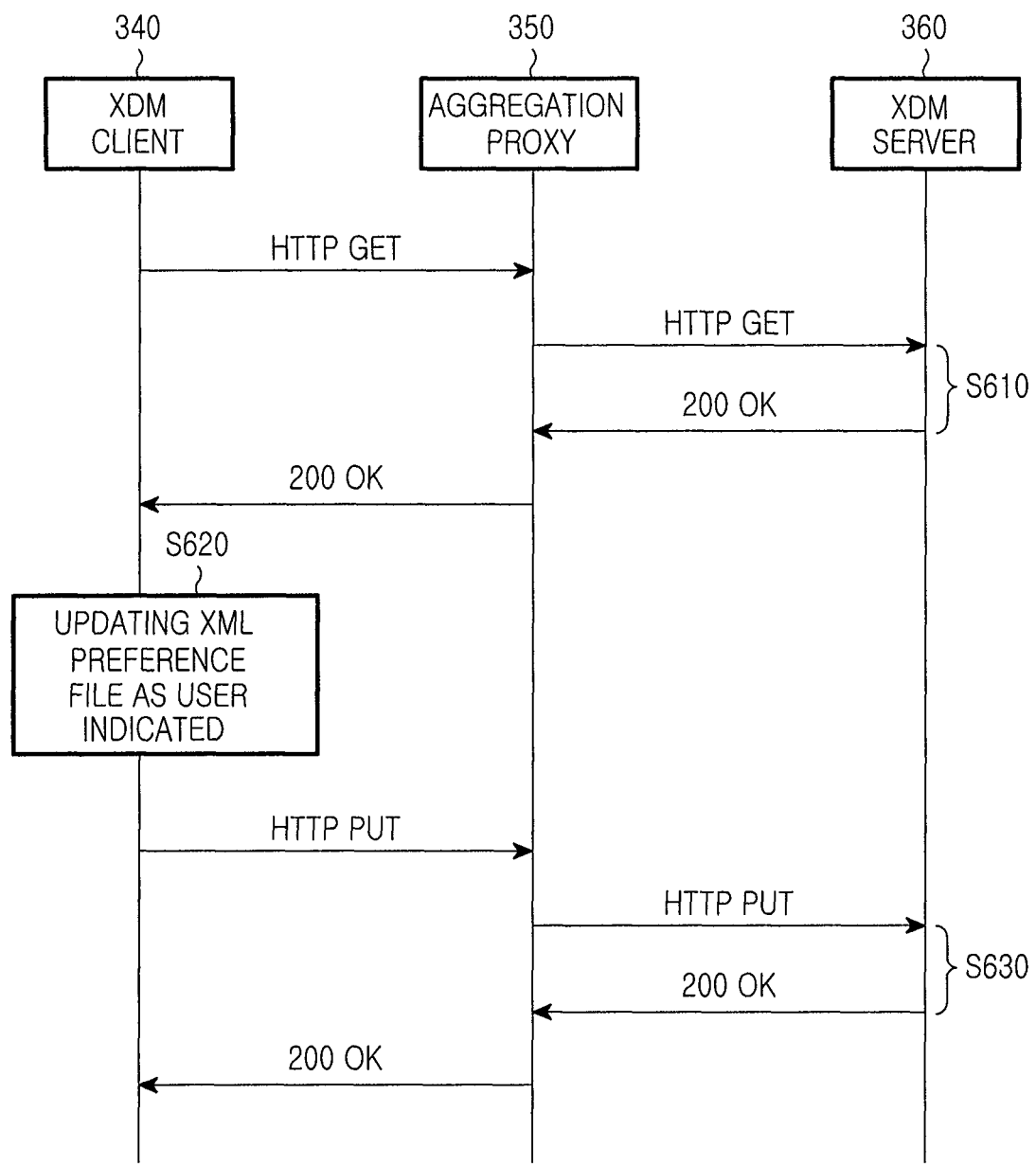
FIG. 6 depicts a user's updating a preferences profile.

The invention proposes to use XCAP GET and XCAP PUT methods for performing any one of the above-specified operations as requested by the user (S610, S620, S630). These operation is illustrated in FIG. 6.

A user may want to indicate an active profile out of various user preference profiles stored in the XDMS 360. The invention proposes two methods of performing the operation for "activating a profile":
1. Indicating active profile as flag or attribute
2. Indicating active profile through SIP PUBLISH When the active profile is indicated as a flag or attribute value, as in method 1, there are two ways for an application server to come to know about an activated user preference profile:

1.1 Application server's subscribing to XML (Extended Markup Language) document changes to user preferences profile.
1.2 XDM server's publishing activated profile to corresponding application server.

Figure 7:
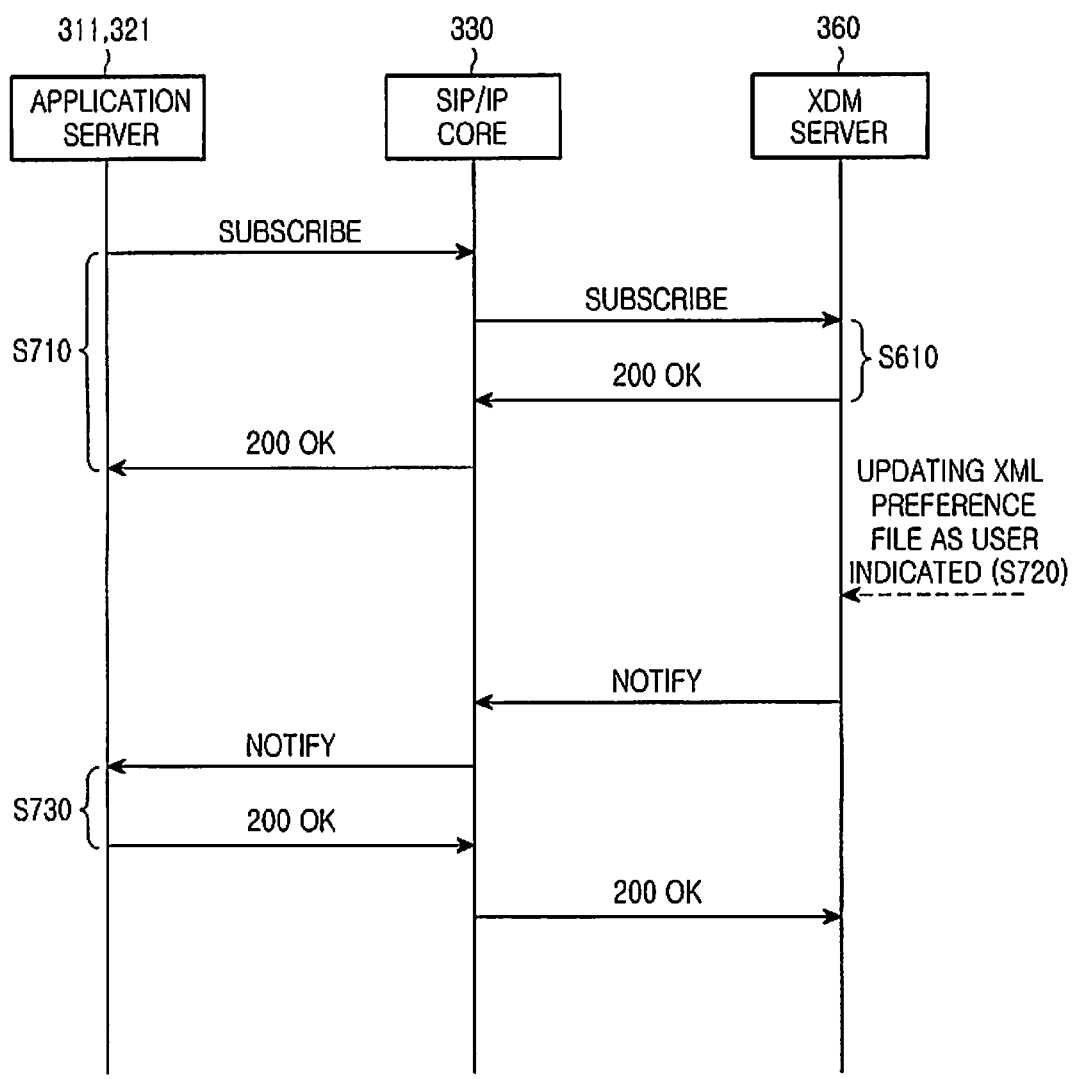
FIG. 7 depicts an application server's subscribing and receiving a notification for changes in a preferences profile.

The way for an application server to subscribe to XML document changes to a user preferences profile (method 1.1) is as follows:

The application server needs to SUBSCRIBE for any changes to an XML document user preferences profile. FIG. 7 illustrates an example of the sequence of operations. An SUBSCRIBE request can carry filters according to draft-ietf-simple-event-filter-funct and draft-ietf-simple-filter-format (S710), so that the application server 311, 321 receives only relevant notifications when the XML document changes. In this way, the application server is aware of the activated profile as and when the user changes/indicates the active profile. SIP NOTIFY, which is a notification to XML document change subscription from the application server 311, 321, will carry the changes made by the user (S730). The notification is composed after applying filter rules if any filter rule is requested in the associated SUBSCRIBE request. The application server 311, 321 locally stores indication of the active profile and also the user preference contents for those service settings for future execution purposes (S720). The application server 311, 321 is now aware of the user preference profile and therefore will execute those settings as in the existing prior art. Also, the application server 311, 321 will be aware of any changes to the user preferences of any user preference profile itself dynamically via the SIP NOTIFY notification.

Subsequently, SUBSCRIBE and NOTIFY will be seen as described in below examples.

An example of SUBSCRIBE and NOTIFY with active profile indication by an attribute is presented below in Table 6:

TABLE 6

```
SUBSCRIBE sip:jay@example.com
Via: SIP/2.0/TCP
poc-server.example.com:5060;branch=z9hG4bKxjfdsjfk
To: <sip:jay@example.com>;tag:12341111
From: <sip:jay@example.com>
Call-ID: 32432udfidfjmk342
Cseq: 1 SUBSCRIBE
Expires: 0
Event:xcap-diff path="org.openmobilealliance.user-profile/users/sip:jay
@example.com/service-setting"
   Contact: sip:jay@poc-server.example.com
   Content-Type: application/simple-filter+xml
   Content-Length: ...
   <?xml version="1.0" encoding="UTF-8"?>
   <filter-set xmlns="urn:ietf:params:xml:ns:simple-filter">
      <ns-bindings>
         <ns-binding                               prefix="srv"
urn="urn:oma:params:xml:ns:service-setting"/>
      </ns-bindings>
      <!-- Filter for "default" or "active" poc service settings -->
      <filter id="123" uri="sip:jay@example.com">
         <what>
            <include>
/srv:service-profile-set/
srv:service-profile[@status="active"]/common-service-settings
            </include>
            <include>
/srv:service-profile-set/srv:service-profile[@status="active"]/
service-setting[@service-id="org.openmobilealliance.poc"]
            </include>
         </what>
      </filter>
   </filter-set>
```

TABLE 6-continued

```
NOTIFY sip:jay@client.example.com SIP/2.0
Via: SIP/2.0/TCP
user-profile.example.com:5060;branch=z9hG4bKxjfder
To: <sip:jay@example.com>;tag:12341111
From: <sip:jay@example.com>;tag:232321
Call-ID: 32432udfidfjmk342
Cseq: 1 NOTIFY
Event:xcap-diffpath="org.openmobilealliance.user-profile/users/sip:jay
@example.com/service-setting"
   Subscription-State: active; expires=3599
   Contact: sip:jay@user-profile.example.com
   Content-Type: application/vnd.oma.user-service-setting+xml
   Content-Length: ...
   <?xml version="1.0" encoding="UTF-8"?>
   <service-profile-set user="jay@example.com">
     <service-profile id="3i8jx" name="home" status="active">
       <common-service-settings/>
       <service-settings service-id="org.openmobilealliance.poc">
         <answer-mode>manual</answer-mode>
<incoming-poc-session-
barring>inactive</incoming-poc-session-barring>
   <incoming-instant-personal-alert-barring>inactive</
incoming-instant-personal-alert-barring>
<simultaneous-poc-session-support>inactive</
simultaneous-poc-session-support
>
       </service-settings>
     </service-profile>
   </service-profile-set>
```

An example of SUBSCRIBE and NOTIFY with active profile indication by an attribute is presented below in Table 7:

TABLE 7

```
SUBSCRIBE sip:jay@example.com
Via: SIP/2.0/TCP
poc-server.example.com:5060;branch=z9hG4bKxjfdsjfk
To: <sip:jay@example.com>;tag:12341111
From: <sip:jay@example.com>
Call-ID: 32432udfidfjmk342
Cseq: 1 SUBSCRIBE
Expires: 0
Event:xcap-diffpath="org.openmobilealliance.user-profile/users/sip:jay
@example.com/service-setting"
   Contact: sip:jay@poc-server.example.com
   Content-Type: application/simple-filter+xml
   Content-Length: ...
   <?xml version="1.0" encoding="UTF-8"?>
   <filter-set xmlns="urn:ietf:params:xml:ns:simple-filter">
     <ns-bindings>
       <ns-binding                                    prefix="srv"
urn="urn:oma:params:xml:ns:service-setting"/>
     </ns-bindings>
     <!-- Filter for "default" or "active" poc service settings -->
     <filter id="123" uri="sip:jay@example.com">
       <what>
         <include>
           /srv:service-profile-set/srv:service-profile[@name=
/srv:service-profile-set[active_profile]]/
common-service-settings
         </include>
         <include>
           /srv:service-profile-set/srv:service-profile[@name=
/srv:service-profile-set[active_profile]]/
service-setting[@service-id="org.openmobile
alliance.poc"]
         </include>
       </what>
     </filter>
   </filter-set>
-----------------------------------------------------------------
NOTIFY sip:jay@client.example.com SIP/2.0
Via: SIP/2.0/TCP
user-profile.example.com:5060;branch=z9hG4bKxjfder
To: <sip:jay@example.com>;tag:12341111
From: <sip:jay@example.com>;tag:232321
```

TABLE 7-continued

```
Call-ID: 32432udfidfjmk342
Cseq: 1 NOTIFY
Event:xcap-diffpath="org.openmobilealliance.user-profile/users/sip:jay
@example.com/service-setting"
   Subscription-State: active; expires=3599
   Contact: sip:jay@user-profile.example.com
   Content-Type: application/vnd.oma.user-service-setting+xml
   Content-Length: ...
   <?xml version="1.0" encoding="UTF-8"?>
   <service-profile-set user="jay@example.com" active_profile="home">
     <service-profile id="3i8jx" name="home">
       <common-service-settings/>
       <service-settings service-id="org.openmobilealliance.poc">
         <answer-mode>manual</answer-mode>
<incoming-poc-session-barring>inactive</
incoming-poc-session-barring>
   <incoming-instant-personal-alert-barring>inactive</
incoming-instant-personal-alert-barring>
<simultaneous-poc-session-support>inactive</
simultaneous-poc-session-support
>
       </service-settings>
     </service-profile>
   </service-profile-set>
```

Figure 8:
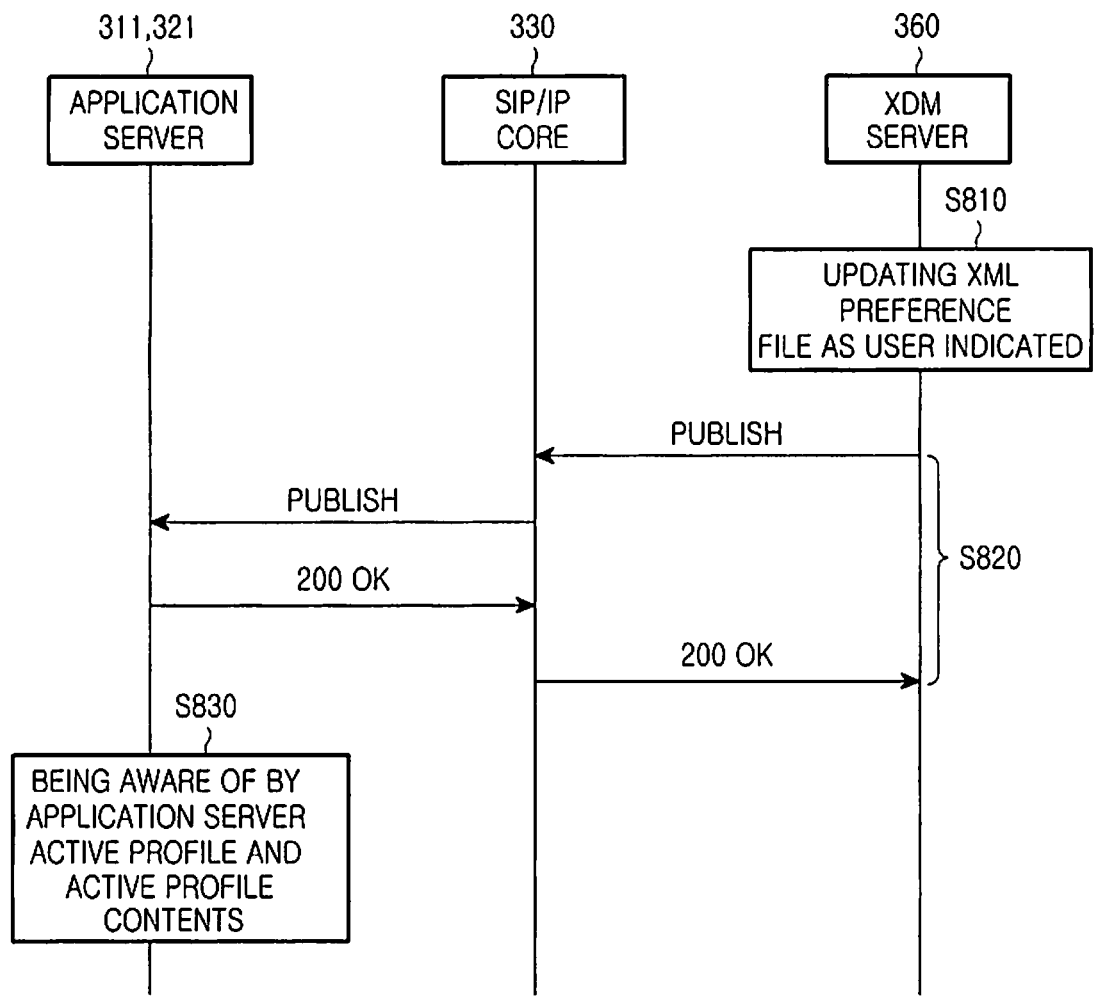
FIG. 8 depicts an XDMS's publishing an activated profile and active profile contents.

The way for an XDM Server to publish the activated profile to a corresponding application server (method 1.2) is as follows:

In this method, as soon as the user modifies the user preference profile XML document, the XDM Server sends SIP PUBLISH containing the active profile and also the contents of the active profile to the application server. The sequence of operations are as illustrated in an example of FIG. 8. The application server 311, 321 locally stores indication of the active profile and also the user preferences contents for those service settings for future execution purposes (S830). The application server 311, 321 is now aware of the user preference profile and therefore will execute those settings as in the existing prior art.

As an alternative, this method proposes to use the SIP PUBLISH method for indicating the application server about the active profile. A difference when compared to the prior art is that the user will publish only active profile name setting when he/she registers through SIP REGISTER or whenever he/she wants to change the active profile. SIP PUBLISH is generated with the following clarifications:

Application Server Identifier: for example, PoC or IM or CPM identifier

Event: new event package "preference-settings"

Body: contains a target profile to be activated and its URL stored in the user preference XDMS.

New event package "preference-settings":

The name of the new event package can be named as "preference-settings". This value may appear in the event header field present in SIP PUBLISH.

Body contents for SIP PUBLISH with event "preference-settings":

The body of an SIP PUBLISH request contains a preference-setting document in an "application/preferences-settings+xml" data format. This preference-setting document describes preferences-related settings of a user. The format of the preference-setting document identified with the MIME type "application/preferences-settings+xml" is defined with an example below:

TABLE 8

```
<?xml version="1.0" encoding="UTF-8"?>
  <preferences-settings>
    <target-profile                          name="home"
url="org.openmobilealliance.user-profile/users/sip:jay
@example.com/service-setting"/>
  </preferences-settings>
```

A user preference-setting document begins with the root element tag <preferences-settings>. It consists of a <target-profile> element including the following attributes:

"name" attribute containing unique identifier of target profile to be activated, and "url" attribute containing URL, unique identifier of user preference document present in user preference XDMS of specific user.

Figure 9:
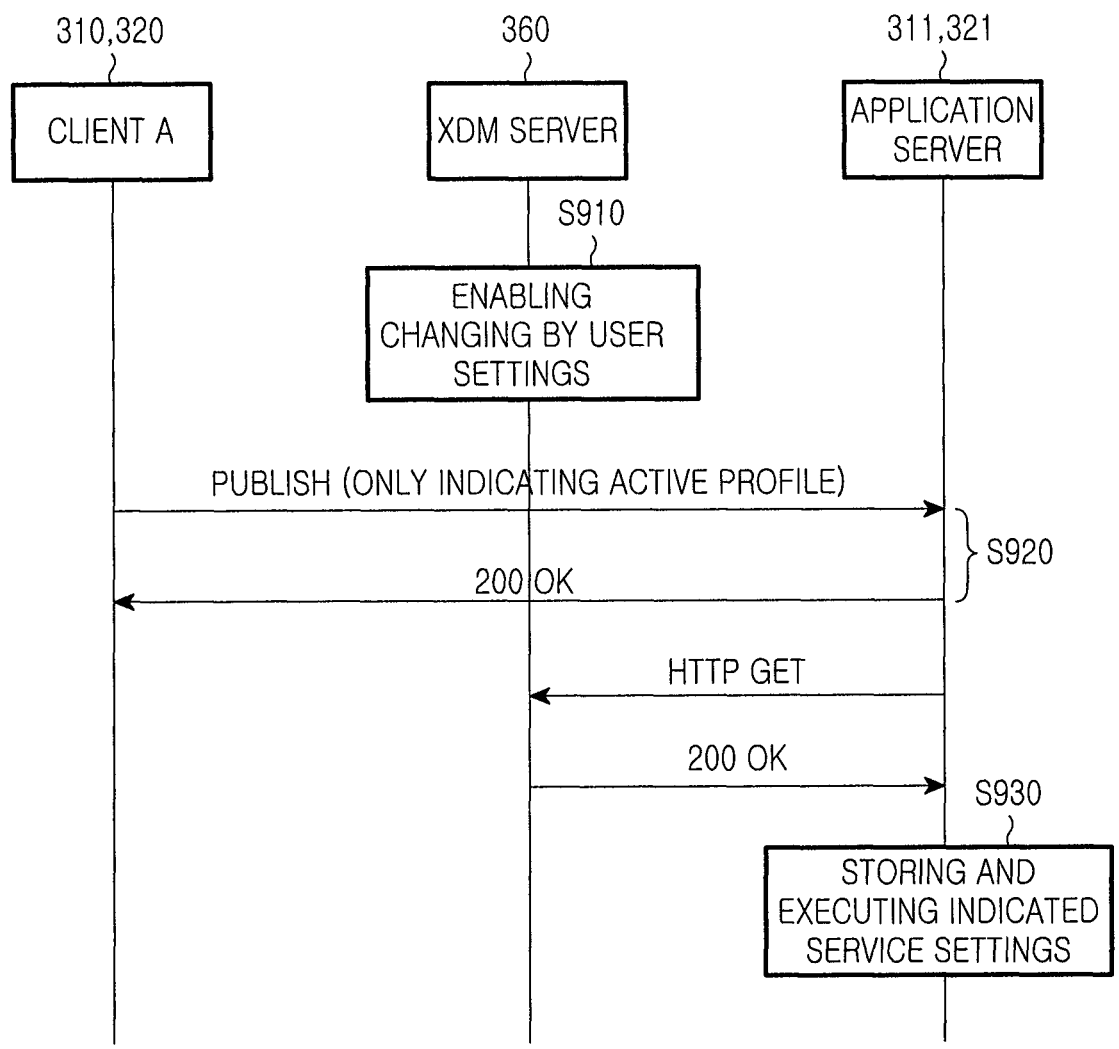
FIG. 9 depicts a client's publishing an active profile and an application server's fetching the contents of the active profile.

On receiving publication of active-profile indication, the application server fetches user preferences of the activated profile from the XDM Server. The method of fetching active profile contents is to obtain them via the XCAP GET method or to subscribe for document changes to the active profile through the SIP SUBSCRIBE method. The application server locally stores indication of the active profile and also user preference contents for those service settings for future execution purposes. The application server is now aware of the user preference profile and therefore will execute those settings as in the existing prior art. The sequence of operations are illustrated in FIG. 9.

If the application server 311, 321 needs to be aware of any changes to the user preferences of any user preference profile, then the application server 311, 321 needs to subscribe for any changes to the XML document user preferences profile. In this way, the application server 311, 321 is almost instantly aware of the changes made by the user via SIP NOTIFY.

The whole invention can be summarized with flows explained below in connection with FIGS. 10 to 12.

Figure 10:
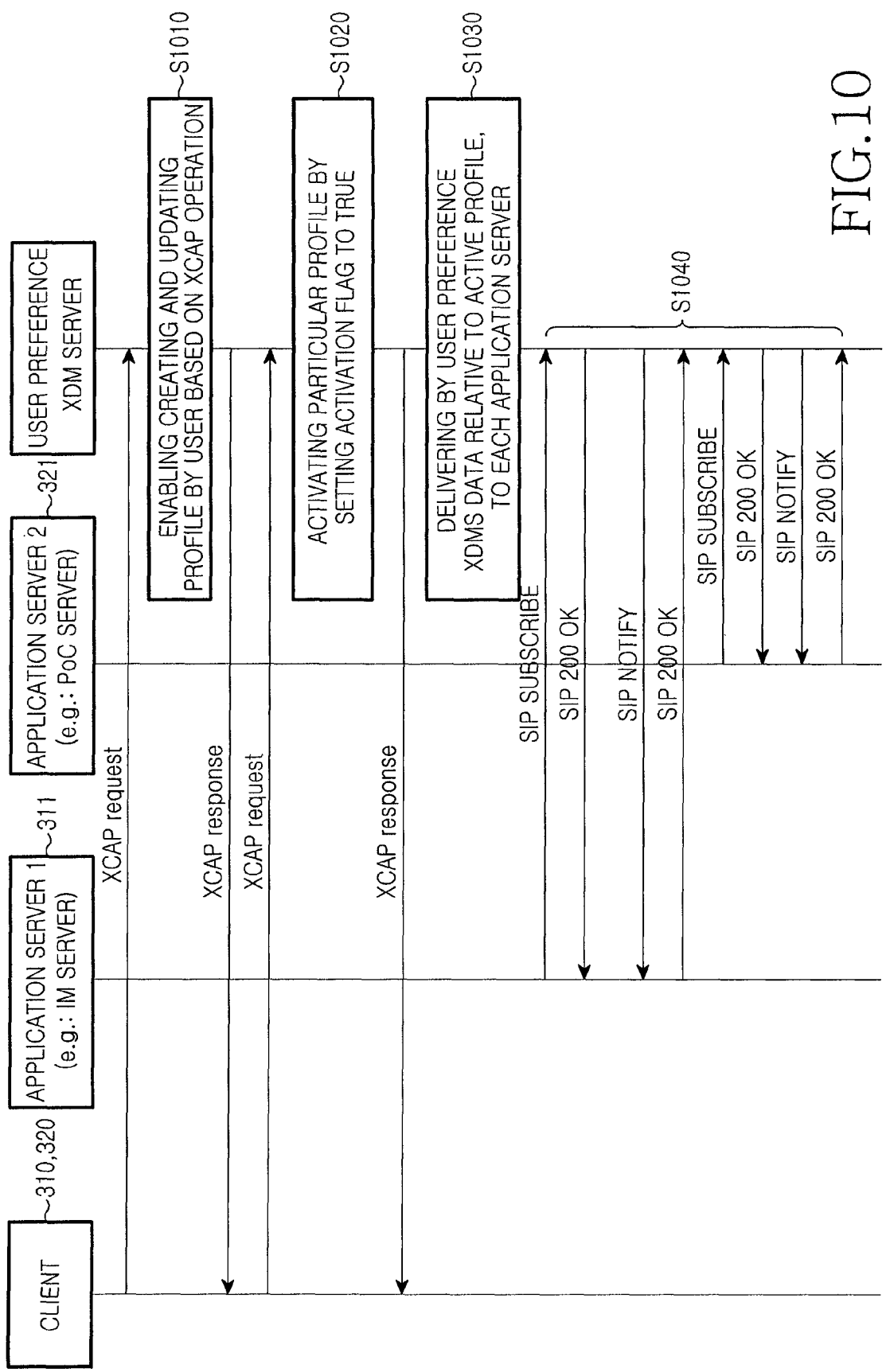
FIGS. 10 to 12 depict operational flows in three method according to the invention respectively.

FIG. 10—Summary of Inventive Method 1:

FIG. 10 summarizes procedures of a first method proposed in the invention.

Create/Update User Preferences Profile:

A user's multiple service profiles are consolidated in one place of a "user preference XDMS" (S1010).

1. The user can create or modify his user preference profile with an XCAP PUT request originating from his client to the user preferences XDMS.

2. The user preference XDMS creates/updates the user preference profile if the request is from an authenticated user.

3. The user preferences XDMS processes the XCAP PUT request, and acknowledges to the client for a result thereof.

Activate User Preference Profile:

Each user preference profile in the user preference XDMS has an "activation flag", and the user can activate a particular profile by setting this flag to TRUE (S1020).

4. The user can set the "activation flag" in his user preference profile (user preference profile created as explained in step 1) with an XCAP PUT request originating from his client to the user preference XDMS.

5. The user preferences XDMS is aware of the profile name that the user wants an application server to use.

6. The user preference XDMS processes the XCAP PUT request, and acknowledges to the client for a result thereof.

Post Activation of User Preference Profile:

Delivery of the activated profile to the application server is achieved by the application server's subscribing to the activated profile document changes. Updating of the activated profile will also be delivered to the application server using the subscribed event (S1030).

7. Upon activation of the user preference profile, the user preference XDMS notifies the pertinent part of the activated user preference profile to each application server, as will be explained in below steps.

8. Since the application server keeps the subscription to the "activation flag" changes, it can be notified of the activated user preference profile. In order to do so, the application server originates a SIP SUBSCRIBE request to the user preference XDMS with the following clarifications:

Event: xcap-diff

Target Document: user preference profile document

Filter Description: if the 'activation flag' is set, the pertinent part of the corresponding user preference profile should be notified.

9. The user preference XDMS processes the SIP SUBSCRIBE request, and acknowledges to the application server for a result thereof.

10. The user preference XDMS originates a notification of the activated user preference profile contained in SIP NOTIFY to the application server with the following clarifications:

Event: xcap-diff

Body: part of activated user preference profile pertinent to corresponding application server.

11. The application server processes the SIP NOTIFY request, and acknowledges to the user preferences XDMS for a result thereof.

Figure 11:
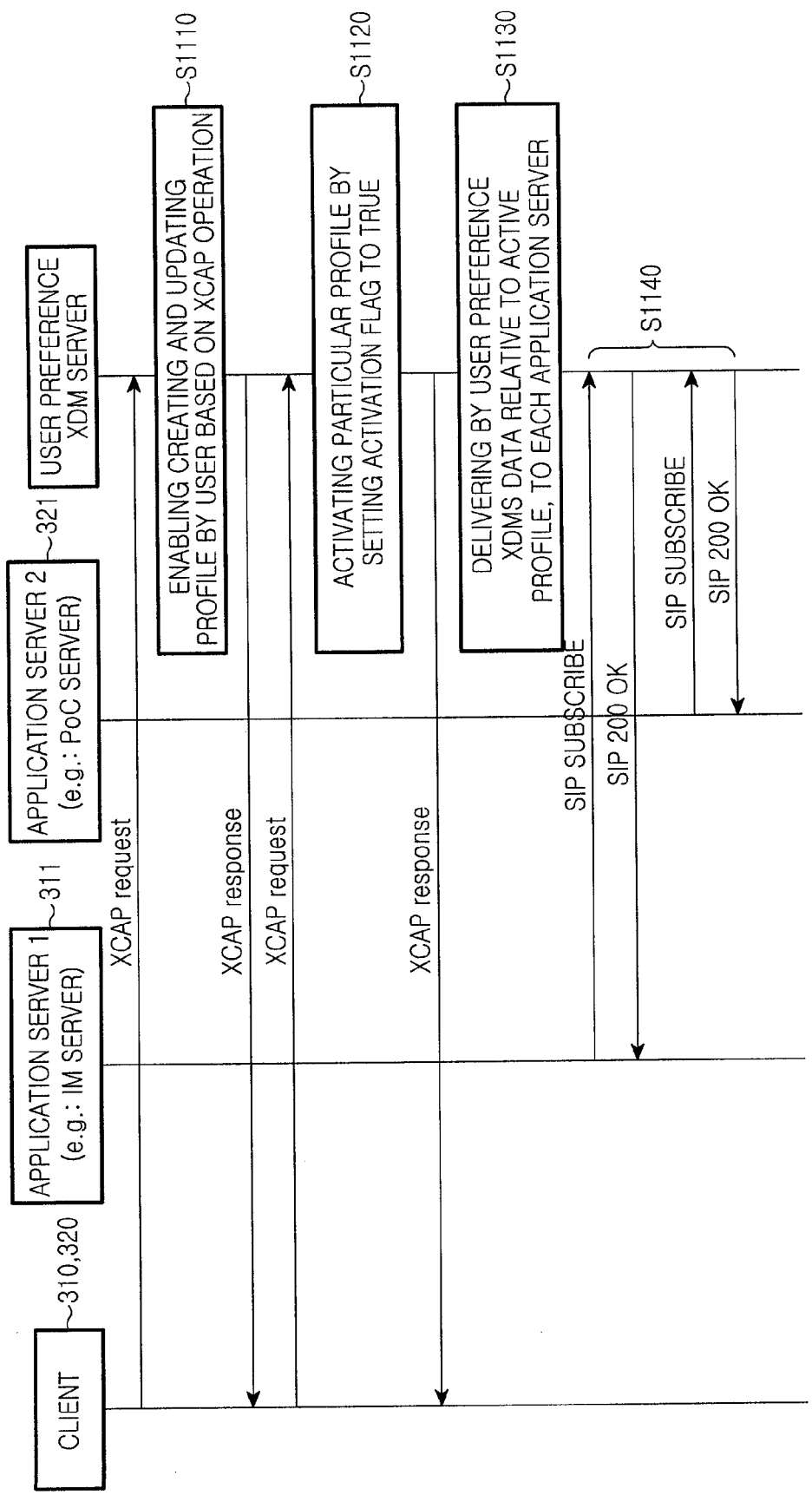

FIG. 11—Summary of Inventive Method 2:

FIG. 11 summarizes procedures of a second method proposed in the invention.

Create/Update User Preference Profile:

A user's multiple service profiles are consolidated in one place of a "user Preference XDMS" (S1110).

1 to 3. Same as steps 1 to 3 explained in chapter "Summary of Inventive Method 1".

Activate User Preference Profile:

Each service profile in the user preference XDMS has an "activation flag", and the user can activate a particular profile by setting this flag to TRUE (S1120).

4 to 6. Same as steps 4 to 6 explained in chapter "Summary of Inventive Method 1".

Post Activation of User Preference Profile:

The user preference XDMS will notify or deliver the part of the activated profile pertinent to the application server to that application server by using SIP PUBLISH to a service setting-related event package. Updating of the activated profile will also be delivered to the application server by using SIP PUBLISH (S1130).

7. Same as step 7 explained in chapter "Summary of inventive Method 1".

8. The user preference XDMS originates an SIP PUBLISH request containing that part of the active profile to the application server with the following clarifications:

Event: application server's event for service setting, e.g. "poc-settings"

Application Server Identifier: e.g., media feature tag

Body: contains pertinent part of activated user preference profile

9. The application server processes acknowledges to the user preferences XDMS for the SIP PUBLISH request.

Figure 12:
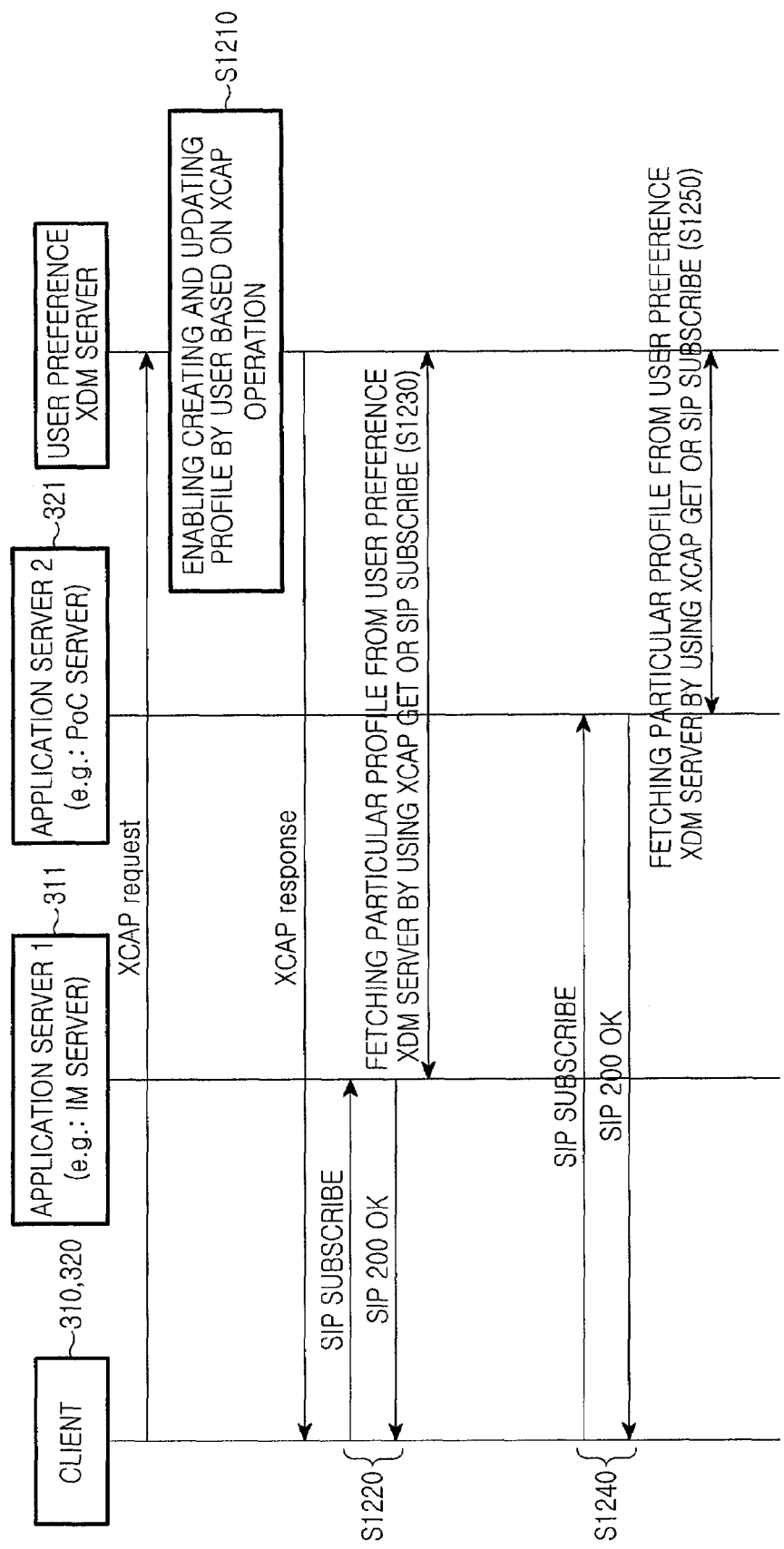

FIG. 12—Summary of Inventive Method 3:

FIG. 12 summarizes procedures of a third method proposed in the invention.

Create/Update User Preference Profile:

A user's multiple service profiles are consolidated in one place of a "user preference XDMS" (S1210).

1 to 3. Same as steps 1 to 3 explained in chapter "Summary of Inventive Method 1".

Activate User Preference Profile:

The user activates the user preference profile per application by using SIP PUBLISH. The contents of the SIP PUBLISH may be the pointer to a target user preference profile to be activated, which resides in the user preferences XDMS (e.g., Home profile, Office profile). A new event may be needed for this, e.g., "preference-settings" (S1220, S1240).

4. The user can indicate his choice of the user preference profile to be activated (user preference profile created as explained in step 1) from his client to the application server in an SIP PUBLISH request with the following clarifications:

Application Server Identifier: e.g., PoC or IM or CPM identifier

Event: new event "preference-settings"

Body: contains target profile to be activated with its URL in user preference XDMS 5. The application server processes the SIP PUBLISH request, and acknowledges to the client for a result thereof.

Post Activation of User Preferences Profile:

6. The application server then fetches the contents of the activated user preference profile from the user preference XDMS by using either an XCAP GET request or an SIP SUBSCRIBE request (S1230, S1250).

6.1. Using XCAP GET request: in order to receive the contents of the activated user preference profile from the user preferences XDMS, the application server originates the XCAP GET to the URL of the target user preference profile to be activated, which it has come to know through the SIP PUBLISH in step 4.

The 200 OK response from the user preference XDMS to the application server contains user preferences fetched from the activated user preference profile.

6.2. Using SIP SUBSCRIBE Request: the application server subscribes to the user preference profile in the XDM server, which the user requests it to activate, by using the SIP PUBLISH in step 4. Then, the application server is notified of the contents of the activated user preference profile and any updates thereof. Thus, the application server originates an SIP SUBSCRIBE request to the user preference XDMS with the following clarifications Event: xcap-diff Target Document: user preference profile document Filter Description: "active profile name", which pertinent part of corresponding profile should be notified.

Followed by steps 9 to 11 as explained in chapter "Summary of Inventive Method 1".

More automation may be provided to scheduled activating of profiles, life time of an active profile, etc.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

The invention claimed is:

1. A method of managing a user preference profile in a client, the method comprising the steps of:

creating a plurality of user preference profiles, wherein each user preference profile includes a plurality of service settings, each of the service settings corresponding to each of a plurality of applications including a PoC (Push to talk over Cellular) application and an IM (Instant Messaging) application;

sending the plurality of user preference profiles to a shared server comprising an XDM (eXtensible Markup Language (XML) Document Management) server, and retrieving or changing the user preference profiles already stored in the XDM server by using an XCAP (XML Configuration Access Protocol); and sending a request for activating a user preference profile among the plurality of user preference profiles;

wherein the activated user preference profile is sent from the shared server to respective application servers corresponding to respective service settings included in the activated user preference profiles, without a request of the respective application servers.

2. The method as claimed in claim 1, further comprising the step of retrieving or changing the user preference profiles stored in the shared server.

3. The method as claimed in claim 1, wherein the step of sending a request comprises the step of activating the user preference profile by the XDM clients' setting flags or attributes of the user preference profile through the XCAP.

4. The method as claimed in claim 3, wherein the activated user preference profile is sent from the XDM server to the corresponding application servers by means of an SIP event publication using SIP PUBLISH.

5. The method as claimed in claim 3, wherein the activated user preference profile is subscribed to by the corresponding application servers by means of an SIP event publication using SIP SUBSCRIBE.

6. The method as claimed in claim 1, wherein the step of sending a request comprises the step of selectively activating the user preference profile by sending name of the user preference profile.

7. The method as claimed in claim 6, further comprising the step of subscribing to the activated user preference profile from the XDM server.

8. A non-transitory computer storage medium having recorded therein a method for managing a user preference profile, the method comprising:

receiving, from a client, a plurality of user preference profiles including service settings corresponding to each of a plurality of applications including a PoC (Push to talk over Cellular) application and an IM (Instant Messaging) application and a request for activating a user preference profile among the plurality of user preference profiles;

storing the plurality of user preference profiles;

activating the user preference profile for which the request for activating is received; and sending the activated user preference profile from a shared server comprising an XDM (eXtensible Markup Language (XML) Document Management) server to respective application servers corresponding to respective service settings included in the activated user preference profile, without a request of the respective application servers, and retrieving or changing the user preference profiles already stored in the XDM server by using an XCAP (XML Configuration Access Protocol).

9. The method as claimed in claim 8, wherein the plurality of user preference profiles is created, retrieved or changed by the client.

10. A non-transitory computer storage medium having recorded therein a method for managing a user preference profile, the method comprising:

creating a plurality of user preference profiles including service settings corresponding to each of a plurality of applications including a PoC (Push to talk over Cellular) application and an IM (Instant Messaging) application; and sending the plurality of user preference profiles to a shared server comprising an XDM (eXtensible Markup Language (XML) Document Management) server, and a request for activating a user preference profile among the plurality of user preference profile, and retrieving or changing the user preference profiles already stored in the XDM server by using an XCAP (XML Configuration Access Protocol), wherein the selectively activated user preference profile is sent from the shared server to respective application servers corresponding to respective service settings included in the activated user preference profile, without a request of the respective application servers.

11. The method as claimed in claim 10, wherein the client further comprises means for retrieving or changing the plurality of user preference profiles stored in the shared server.

12. A method for managing a user preference profile in a shared server, the method comprising:

receiving a plurality of user preference profiles from a client, wherein each user preference profile includes a plurality of service settings, each of the service settings corresponding to at least one of a plurality of applications including a PoC (Push to talk over Cellular) application and an IM (Instant Messaging) application, storing the plurality of user preference profiles;

receiving a request for activating a user preference profile among the plurality of user preference profile;

activating the user preference profile; and sending the activated user preference profile from the shared server to respective application servers corresponding to respective service settings included in the activated user preference profile, without a request of the respective application servers, the shared server comprising an XDM (eXtensible Markup Language (XML) Document Management) server, and retrieving or changing the user preference profiles already stored in the XDM server by using an XCAP (XML Configuration Access Protocol).

13. The method as claimed in claim 12, wherein the plurality of user preference profiles is created, retrieved or changed by the client.

14. The method as claimed in claim 12, wherein the client is an XDM client for managing the plurality of user preference profiles, which is connected to the XDM server via an aggregation proxy and is connected to the application client via an SIP/IP core.

15. The method as claimed in claim 12, wherein the activated user preference profile is selectively activated by setting a flag or attribute of the user preference profile through the XCAP.

16. The method as claimed in claim 15, wherein the XDM server sends the activated user preference profile to the corresponding application server by means of an SIP event publication using SIP PUBLISH.

17. The method as claimed in claim 15, wherein the respective application servers subscribe to the selectively activated user preference profile from the XDM server by means of an SIP event publication using SIP SUBSCRIBE.

18. The method as claimed in claim 12, wherein the activated user preference profile is selectively activated by sending a name of the user preference profile to the corresponding application server.

19. The method as claimed in claim 18, wherein the respective application servers fetch the selectively activated user preference profile from the XDM server by using XCAP GET of the XCAP.

20. The method as claimed in claim 18, wherein the respective application servers subscribe to the selectively activated user preference profile from the XDM server by means of an SIP event notification using SIP SUBSCRIBE.

* * * * *